April 25, 1967 G. P. S. YSSEL 3,316,397
VEHICLE HEADLAMP ADJUSTING MEANS
Filed Nov. 10, 1964 3 Sheets-Sheet 2
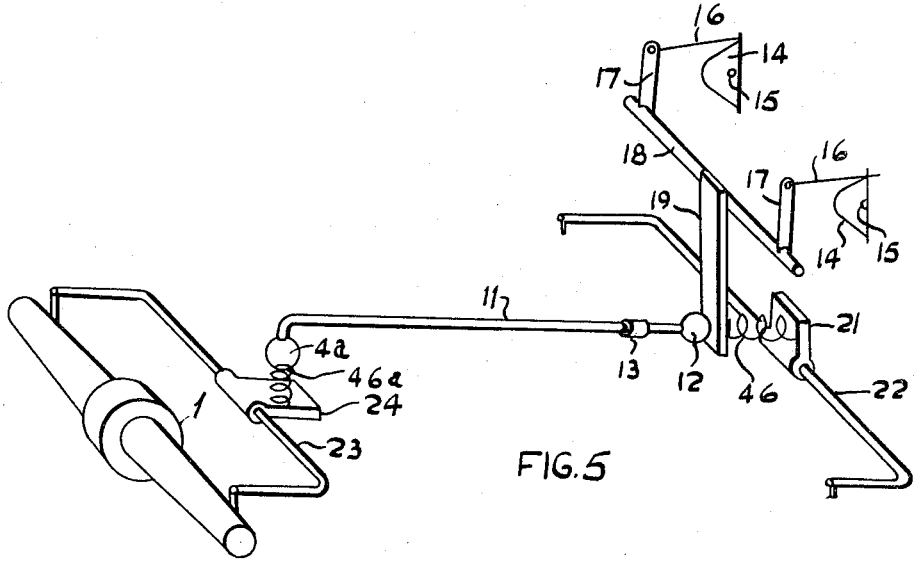
FIG. 5
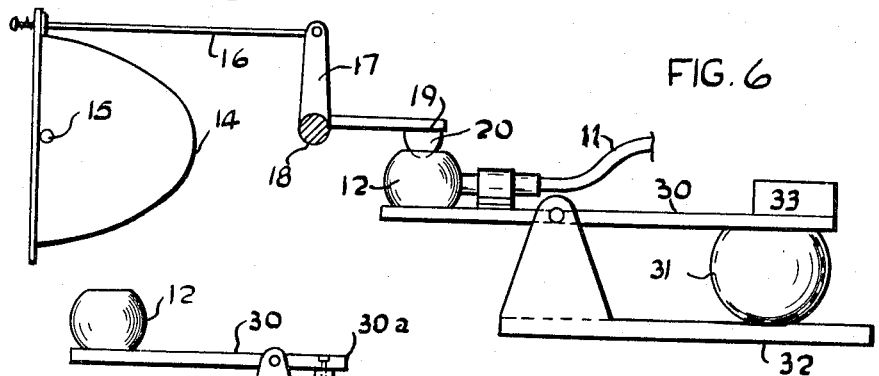
FIG. 6
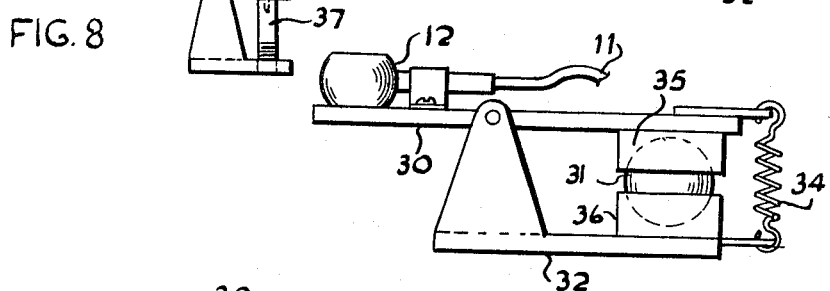
FIG. 8
FIG. 7
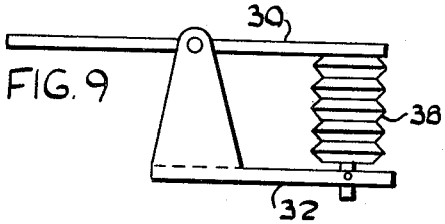
FIG. 9
Inventor:
Gideon Petrus Schoeman Yssel
By
Karl W. Flocks
Attorney April 25, 1967  G. P. S. YSSEL  3,316,397
VEHICLE HEADLAMP ADJUSTING MEANS
Filed Nov. 10, 1964  3 Sheets-Sheet 3

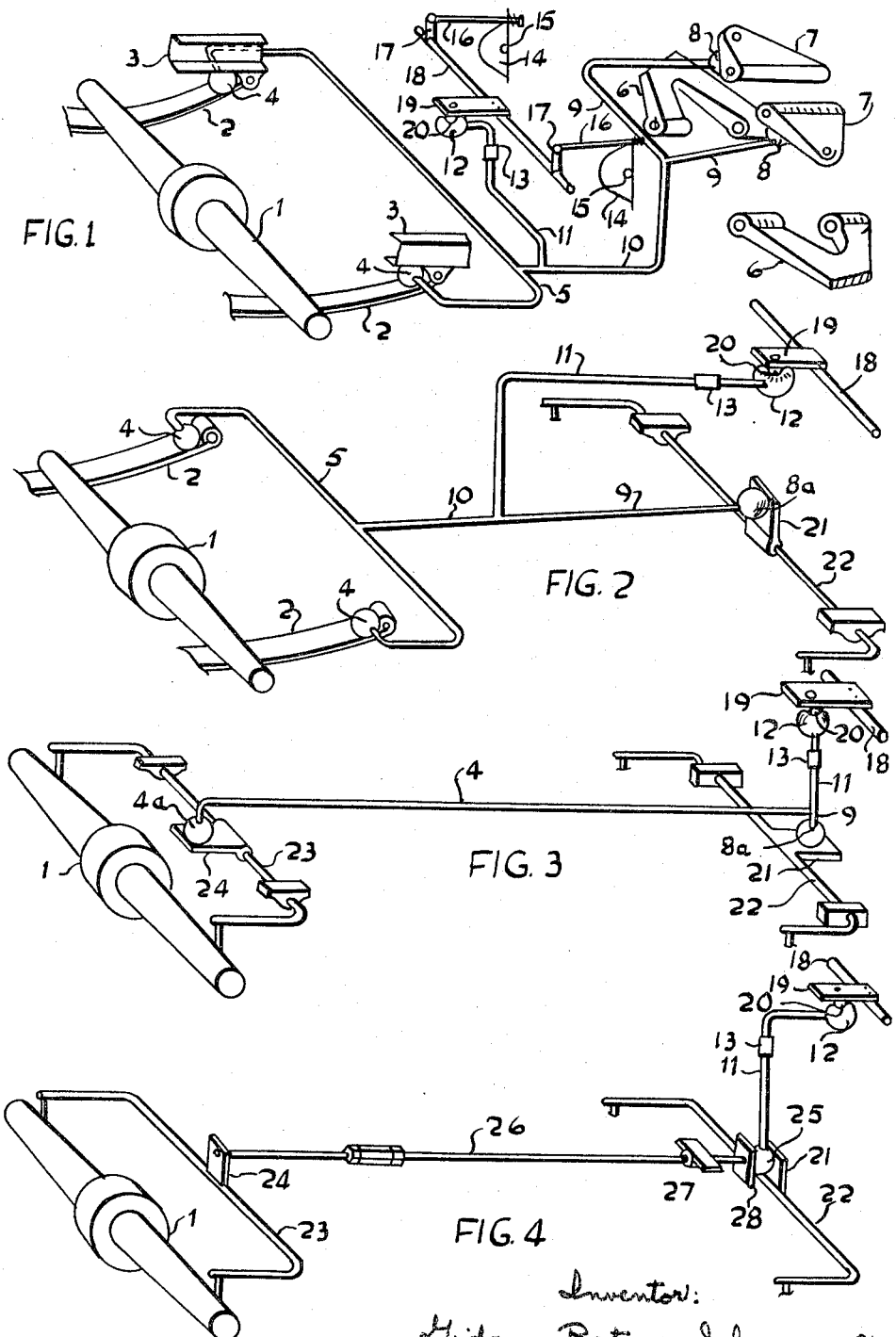

Inventor:
Gideon Petrus Schoenman Yssel
By
Karl W. Flocks
Attorney

United States Patent Office 3,316,397
Patented Apr. 25, 1967

3,316,397
VEHICLE HEADLAMP ADJUSTING MEANS
Gideon Petrus Schoeman Yssel, "Sanitas," P.O. Noordbrug, District Potchefstroom, Transvaal, Republic of South Africa
Filed Nov. 10, 1964, Ser. No. 410,140
15 Claims. (Cl. 240—7.1)

This invention relates to means for automatically adjusting the headlamps of a motor and like vehicle having the headlamps mounted on a body which is resiliently carried on wheels so that during darkness the light beams remain correctly directed with respect to a mean plane containing the wheel axes under varying and differently loaded conditions of the vehicle body. When the load on a vehicle body is disposed at different locations or positions, or when the vehicle is rapidly accelerated or braked, the rear or front (as the case may be) of the vehicle is forced downwardly and produces the undesirable and often dangerous effect of changing the mean angle of the light beams, emitted by the headlamps, relative to the road surface.

According to the invention the automatic headlamp adjusting means for a wheeled vehicle having a resiliently suspended body includes headlamps tiltably mounted on the body of the vehicle, actuating means associated with members of the vehicle subjected to movement relative to the body and a mean common plane containing the axes of the vehicle wheels on movement of the body relative to said plane, and devices connected to the headlamps and operated by the actuating means for tilting the headlamps, said actuating means being adapted to effect responsive tilting movement of the headlamps proportionately to uneven displacement of the body of the vehicle relative to the said plane.

The actuating means for tilting the headlamps may incorporate mechanical, electrical, hydraulic and/or pneumatic devices or systems or a combination of any one or more of such devices and/or systems.

With the headlamp tilting mechanism biasing means may be incorporated to return the headlamps to a prearranged position and against which means the actuating means is operative.

The member or members of the vehicle which are movable relative to the sprung and unsprung parts of the vehicle and adapted to control the actuating means, must be provided at least towards that end of the vehicle where sagging or downward movement of the vehicle body during loading always takes place. Preferably the actuating means is controlled by such movable members at the front and rear of the vehicle, as sagging or downward movement of the body at both ends is invariably experienced and usually to different extents. The extent of sagging at the front and rear is dependent on the distribution of the load carried by the vehicle and the suspension systems employed. The direction of headlamp tilting applied by the actuating means from the front of the vehicle is opposite to that from the rear of the vehicle so that, for instance, lesser sagging at the front than at the rear causes a smaller extent of tilting of the headlamps than would be effected by the actuating means controlled only by sagging at the rear.

The tilting mechanism of the headlamps provide crankarm or like means on which the actuating means is operative.

Mechanically operated actuating means may comprise rod or cable members coupled to the tilting mechanism for the headlamps and the members of the vehicle which perform movements relative to the vehicle body and the mean common plane of the wheel axes on loading of the vehicle. In the case of mechanical actuating means, the relatively movable member at the front of the vehicle is arranged to also operate on the headlamp tilting mechanism in a direction opposite to that of the actuating means operated from the rear of the vehicle and produces a counter action resulting in a tilting movement of the headlamps and of the light beams emitted by the headlamps proportionally to the difference in sagging of the vehicle body at the front and at the rear ends.

In the case of pneumatically or hydraulically operated actuating means, for imparting the tilting movement of the headlamps, a sealed conduit is employed containing a fluid and having deformable volume changeable elements for displacing such fluid along the conduit. The said elements are monted on the body of the vehicle and are engaged by or connected to a crank arm of the headlamp tilting mechanism and the relatively movable members connected to the sprung and unsprung parts of the vehicle. The arrangement is such that on inward depression or compression of one or more volume changeable elements, the fluid is displaced into another of such elements which is associated with the headlamp tilting mechanism for expansion of the latter element and movement, against biasing means, of the tilting mechanism to cause controlled tilting of the headlamps in proportion to the sagging of the vehicle body relative to the wheels. In the case where at least one volume changeable element is provided at the front and also at the rear, the effect of sagging of the front and rear of the body causes compression of the element at the rear and expansion (or permits substantially unobstructed expansion) of the element at the front, so that on equal sagging of the front and the rear of the body, no change in volume takes place in respect of the element at the headlamp tilting mechanism, while on uneven sagging of the front and rear of the body a smaller amount of expansion or contraction of the last mentioned element takes place than would be the case if only the rear or the front of the body moved downwardly.

In the case of electrically operated actuating means, use may be made of rheostats and a variable current responsive device, receiving electric current through said rheostat; said device is connected to the headlamp tilting mechanism and causes the tilting of the headlamps in proportion to the sum of the actions of the oppositely operating rheostats at the front and rear regions of the vehicle.

In the actuating means, whether mechanically, hydraulically, pneumatically or electrically operated, suitable devices or means should be incorporated to delay the resultant tilting of the headlamps in order to avoid immediate tilting of the headlamps so that relative movement of the sprung and unsprung parts of the vehicle, due to road irregularities, bumps or the like, can take place without causing tilting of the headlamps.

Instead of mounting the headlamps in pivotal fashion, only the reflector units (in which the bulbs are carried) may be pivotally mounted. In the case of sealed beam headlamps, the entire sealed beam units must be pivotally mounted.

Conveniently, the actuating means is operated from anti-roll bars or the like if provided on the motor vehicle, such bars being provided for the purpose of the invention with crank arms at central positions and of which the free end regions are connected to, or operative on, the actuating means.

The headlamps or the reflectors, arranged on or adjacent both sides of the front of the vehicle body, may be actuated from or may be mounted on a common rotatably oscillatable and transversely arranged bar, rod or shaft.

With the headlamp tilting arrangement according to the invention, means may be included to compensate for fluctuation in atmospheric conditions, such as temperature and atmospheric pressure, which may affect the operation of the invention and consequently the angle of the light beams relative to the road surface.

For the invention to be clearly understood and carried into effect, reference will now be made to the accompanying sheets of drawings in which:

FIGURE 1 is a diagrammatic view showing automatic headlamp beam adjusting means according to the invention;

FIGURE 2 is a fragmentary diagrammatic view showing a modified arrangement of the means according to the invention;

FIGURE 3 is a view similar to FIGURE 2 showing a further modified arrangement of the means according to the invention;

FIGURE 4 is a further view similar to FIGURE 2 showing a still further modified form of the invention;

FIGURE 5 is a view similar to FIGURE 1, showing yet another modified form of the means according to the invention;

FIGURE 6 is a fragmentary view showing the headlamp tilting mechanism according to the invention, applicable on all the arrangements and forms shown in FIGURES 1–5;

FIGURES 7, 8, 9, 10, 11 and 12 are fragmentary views showing modifications of the headlamp tilting mechanisms which all incorporate devices to compensate for changes in atmospheric conditions;

Figure 12:
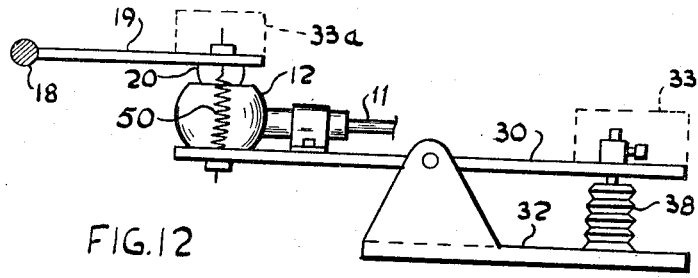
Figure 13:
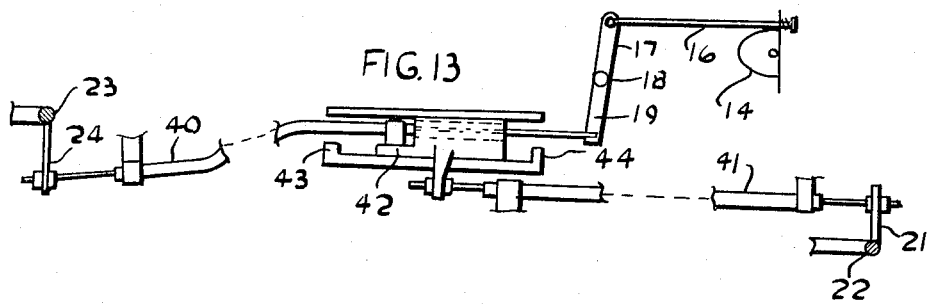
FIGURES 13 and 14 are diagrammatic views of mechanical means for automatically changing the light beams of motor vehicles when subjected to different loadings, also according to the invention.

Referring to FIGURE 1 of the drawings, reference numeral 1 denotes the rear axle of a motor vehicle on which the body is supported by semi-elliptical springs 2 between the front portions of springs 2 and chassis or body parts 3, to which the springs 2 are pivotally connected, resilient material bulbous elements 4 are disposed. Said bulbous elements 4 are connected together by a non-expandable conduit 5. Reference numeral 6 indicates the "wish-bone" suspension members at the front of the vehicle and reference numeral 7 the pivotally mounted control arms mounted in spaced relationship above said "wish-bone" suspension members 6. Below the control arm 7, compressible resilient material bulbous elements 8 are mounted for compression by downward motion of the control arm 8. The bulbous elements 8 are connected together by a conduit 9.

The conduits 5 and 9 are connected by a conduit 10 while from conduit 10 a branch conduit 11 extends which is connected to a further rigidly mounted expandable and compressible resilient material bulbous element 12. In the conduit 11 a restricted passage forming element 13 is connected whereby the flow of the fluid to and from element 12 is retarded.

The headlamps 14 are provided with diametrically opposed pins or stub axles 15 which are pivotally received in suitable bearings on the vehicle body (not shown). The top portions of the headlamps 14 are connected by rods 16 to crank arms 17. The crank arms 17 are provided on a transversely arranged rotatably mounted shaft 18 which is provided with a further crank arm 19. Protruding from a face at the free end of crank arm 19, is a knob-like member 20 having a substantially hemispherical end which pressingly engages onto the bulbous element 12.

The headlamps 14 are biased by spring means to positions when the mean axes of the light beams, emitted by the lamps, are in the positions as would be required under substantially no loading or minimum loading conditions of the motor vehicle.

The fluid contained in the system, composed of the bulbous elements and the conduits, is preferably air and is sealed off in the system, advantageously, under atmospheric pressure.

On subjecting the vehicle to loading, the body moves downwardly relative to the unsprung parts of the vehicle, i.e., the wheels and axles, causing the springs 2 to move closer to the body or body parts 3 at the rear of the vehicle with the resultant compression of the bulbous elements 4 between the spring 2 and said body parts 3. At the front of the vehicle, when subjected to loading, the "wish-bone" frames 6 and the control arm 7 swing upwardly, thus reducing the pressure on the bulbous elements 8, which then expand. On loading of the vehicle, so that sagging of the vehicle body at the front and at the rear is equal, fluid is displaced from the bulbous elements 4 to the bulbous elements 8. On sagging of the rear of the vehicle only, the displaced fluid, on compression of the bulbous elements 4, is displaced along the conduit 11 to the bulbous element 12. Expansion of the bulbous element 12 causes upward deflection of the crank arm 19 and partial rotation of the shaft 18. Similarly the crank arms 17 are swung forwardly which movement is conveyed by the rods 16 to the top regions of the headlamps or headlamp reflectors 14 which are caused to tilt with the upper region forwardly thus causing the light beams, emitted by the headlamps, to tilt downwardly relative to a mean plane of the motor vehicle body.

The effective lengths of the crank arms 17 and 19, the distance between the pivot positions and the position of engagement of each rod 16 with a headlamp 14 as also the extent of maximum compression and expansion of the bulbous elements are chosen and designed so that the angle of the light beams relative to the mean plane containing the wheel axes will remain constant under different loading conditions.

On subjecting the front of the vehicle to a greater load, causing sagging of the front of the vehicle body to a greater extent than at the rear, the bulbous elements 8 expand and the fluid is displaced from the bulbous element 12 thus causing the upper portions of the headlamps or headlamp reflectors 14 to be tilted rearwardly to raise the light beams relative to the vehicle body.

The provision of the restriction forming element 13 in the conduit 11 has the effect of retarding the reaction of fluid displacement to and from the bulbous element 12 in order that the system will not be responsive to spring deflection due to road irregularities and the like. Furthermore, such flow restriction means provides for slow tilting actions of the headlamps.

The bulbous elements 8 may be positioned below the "wish-bone" frames 6 if particularly desired, but it is preferable to mount such elements at a position where they are protected from dirt and flying stones as may be encountered during travelling.

By providing bulbous elements 4 and 8 on both sides of the vehicle, transverse tilting or rocking of the vehicle body will not affect the tilted position of the headlamps as the fluid is transferred from one side element to the co-acting element on the other side.

In the case of a motor vehicle provided with an anti-roll bar or the like at the front, the fluid displacement bulbous elements 8 are replaced by a single bulbous element 8a (see FIGURE 2) which is engaged by a crank arm 21 rigidly fixed to the centre position of the transverse part of the front anti-roll bar 22 as is shown in FIGURE 2. The arrangement is such that when the front of the vehicle sags the crank arm 21 is arranged to move in a forward direction to thereby reduce the pressure on the single bulbous element 8a (replacing the two elements 8) so that, if the rear of the vehicle does not sag, a reduction of pressure in the bulbous element 12 results to cause upward tilting of the headlamps 14.

In cases where an anti-roll bar 23 is also provided at the rear of the vehicle (FIGURE 3), a crank arm 24 is provided on the central portion of the transverse part of such anti-roll bar 23, and which is arranged to swing forwardly on sagging of the rear of the vehicle to perform compression on a single bulbous element 4a, (replacing the two connected bulbous elements 4 shown in FIGURES 1 and 2). In the normal unloaded position of the vehicle the pressure applying crank arms 21, 24 may be horizontally, vertically or obliquely disposed as may be found most convenient on the particular vehicle on which the system according to the invention is to be applied.

In the arrangement according to FIGURE 4, the bulbous elements 4 and 8 or 4a and 8a are replaced by a single bulbous element 25 which is connected by conduit 11 to the bulbous element 12. Said conduit 11 also provides the restriction forming passage element 13. The crank arm 24 of the rear anti-roll bar 23 mounts a rod 26 of adjustable length which is capable of reciprocating movement on swinging of the anti-roll bar 23 and is guided in a guide 27. On the front end of rod 26 a pressure plate 28 is provided engaging on the bulbous element 25 which in turn is also held in engagement with the crank arm 21 of the front anti-roll bar 22. In all the forms shown in FIGURES 1–4, sagging of the rear of the vehicle body increases pressure in the fluid system while sagging of the front of the vehicle body causes a reduction of the pressure in the system.

The bulbous elements, which conveniently consist of rubber or like synthetic material balls or bulbs may be replaced by piston and cylinder assemblies of which the cylinders may be mounted on, say body parts of the vehicle and the pistons to unsprung parts of the vehicle. The said bulbous elements or the cylinder and piston assemblies may incorporate springs or like biasing means normally tending to expand them and increase their volumes.

The sealed conduit and expandable and compressible system preferably contains as operating fluid air sealed off in the system under atmospheric pressure.

To provide for a delayed tilting action of the headlamps 14, a high moment of inertia may be presented by providing an adequately heavy lever to operate the tiltable headlamp mounting means, but other weight means could be provided.

Instead of the conduit and bulbous element system containing a gas, e.g. air, a liquid may be provided. When using a liquid in the system an access valve and a fluid replenishing container, as also means adapted to act as a ram must be provided. In such a system, a suitable liquid or viscous medium should be used while a quantity of air or gas may also be provided which is trapped in an additional vertically arranged container connected to the conduit to act as the ram means.

In the form shown in FIGURE 5 the element 8a or elements 8 is or are not provided. The crank arm 19 is engaged on opposite sides by the element 12 and a compression spring 46, the spring 46 being provided on the crank arm 21 of anti-roll bar 22. The element 4a, in turn is acted upon by crank arms 24 of anti-roll bar 23 through compression spring 46a. Spring 46 maintains engagement of the arm 19 on element 12 and also causes or permits displacement of the crank arm 19.

To compensate for temperature changes the bulbous element 12 may be mounted on one end of biased lever 30 (FIGURE 6), while on the other end a fluid filled bulbous element 31 is provided which rests on a fixed part 32. On increase of temperature and expansion of the fluid in the conduit and bulbous elements system, the fluid contained in the bulbous element 31 also expands to counteract the effect of expansion in said system on lever 19. The biasing of the lever 30 may be in the form of a weight 33. Alternatively to the weight 33 and/or a spring 34 (see FIGURE 7) may be employed. In order to counteract transverse expansion of the bulbous element 31, said element 31 may be received in complementary cup-like half parts 35 and 36 provided respectively on the lever 30 and the fixed part 32.

The end 30a of the lever 30, in a further form as shown in FIGURE 8, may be anchored to the fixed part 32 by a temperature responsive elongatable or contractable metallic element 37 or a temperature responsive concertina-like thermostat device 38 may be employed as is shown in FIGURE 8.

Figure 11:
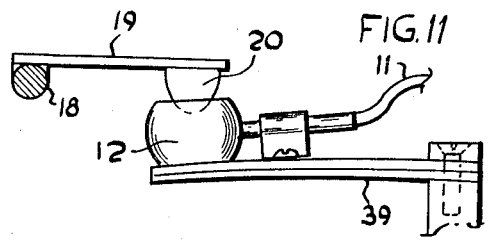
Figure 10:
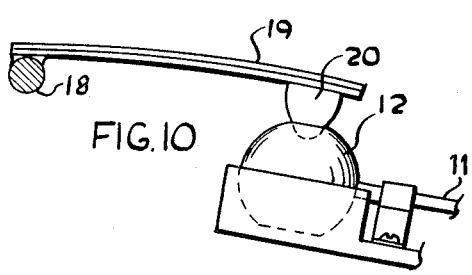

Another form of temperature compensating device is shown in FIGURE 10 in which the crank arm 19 is composed of a bi-metallic strip which changes the position of part 20 relative to the bulbous element 12 during temperature changes. In the form shown in FIGURE 11, the mounting for the bulbous element 12 is on a bi-metallic cantilever-like support 39 while the crank arm 19 is a rigid part fixed to the shaft 18.

The preferred form, shown in FIGURE 12, provides means preventing unintentional relative movement of the arm 19 and element 12 due to road surface irregularities. This may be effected by springs 50 which are of adjustable tension and connect the crank arm 19 and lever 30. Alternatively loading weights 33 and 33a may be provided on the lever 30 and arm 19, as is shown in broken lines in FIGURE 12.

Although reference is hereinbefore made to headlamps which are tilted, it should be readily understood that only the reflector units, mounting the lamp bulbs, can be arranged to be tilted. By tilting the reflector units only, many of the existing types of headlamps are readily adapted, as frequently the reflectors are pivotally mounted for adjustment purposes. With such headlamps, the adjusting screws, usually provided at the tops of the reflector units, are replaced by the connections for rods 16 which pass through the reflector rims or like means. The connection between the rods and reflector rims preferably incorporate resilient means in the form of springs or the like.

In a form of mechanically operated actuating means, by way of example, a cable 40 of the Bowden cable kind, is employed of which one end is connected to the headlamp tilting mechanism for imparting downward tilting of the headlamps when the cable is pulled by virtue of the opposite end being secured to the crank arm of the rear anti-roll bar or the like, as the rear end of the vehicle sags.

A similar cable 41 (or a rod) may be provided and connected to the front anti-roll bar or the like and to the headlamp tilting mechanism. Said second cable 41 is arranged to counteract the action of the first cable 40 when the front end of the vehicle also moves downwardly. In order to obtain such counteracting or compensating effect, the distant end of the casing part of cable 40 is fixed to the body of the vehicle, whereas the opposite end is fastened to an element 42 which is slidable in the direction of the pull of the cable. Said element 42 is slidable between spaced stops 43 and 44 with which stop 43 the element engages when the rear end of the body is completely down and the front wheels just pressing against the road while the other stop 44 is engaged by the element 42 when the front end of the vehicle is pressed right down and the rear wheels just pressing against the road. Said slidable element 42 provides for changing of the effective extent of projection of the inner and relatively movable part of the cable 40 and consequently the angle of movement applied to arm 19, shaft 18 and angle of tilt of the headlamps 14, whereas the cable 41 (or rod), extending from the front of the vehicle, displaces the said element 42 proportionally to the extent of sagging of the front of the vehicle body.

Figure 14:
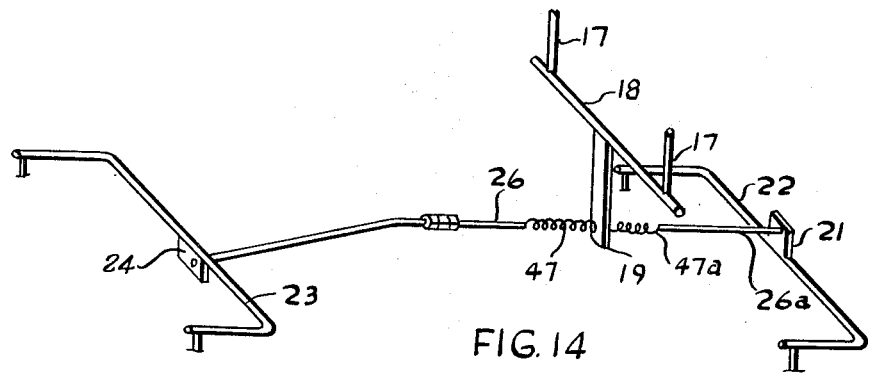

The simplified mechanically operated form of the invention shown in FIGURE 14 provides pushrods 26 and 26a on the antiroll bar crank arms 24, and 21. Said rods 26, 26a are provided with identical compression springs acting on opposite sides of crank arm 19 and cause movement of the tilting mechanism proportionally to the difference of sagging of the front and rear ends of the vehicle body.

With means according to the invention the angle of the light beams, emitted by the headlamps is retained substantially constant relative to the road surface so that the desired distance of road illumination, forwardly of the vehicle, remains substantially constant under "bright" or "dipped" conditions irrespective of the vehicle body inclination relative to the road surface such as when the body is depressed downwardly at the front or the rear due to varied loading conditions of the vehicle or on sharp acceleration or braking. With the means according to the invention, upwardly directed light beams, blinding oncoming traffic, is eliminated and consequently generally safer driving conditions are obtained.

Said bulbous elements, in a simplified form of construction, may comprise short lengths of resilient and flexible rubber or like material tubing, sealed at the ends and connected to the conduits, the conduits conveniently consisting of pressure hose.

According to a further modification the headlamps or reflector units may be arranged to tilt directly by contacting bulbous elements if the swivelling is against friction or restraining means. Identical bulbous elements may be provided which press directly against the lamps or the reflector units whereby the mechanical swivelling or tilting mechanism may be avoided.

In an hydraulic system the bulbous elements actuated by the vehicle suspension members and roll bars or the like, should preferably be expansible or otherwise a quantity of air should be trapped in each bulbous element. In the event of inexpansible bulbous elements, such elements should preferably not be rigidly fixed directly to the body or chassis of the vehicle but should be resiliently mounted on or actuated by spring, elastic and/or air cushions to minimize the danger of bursting caused by excessive pressure application as may occur on sudden vertical movement of a wheel or wheels. The springs 46, 46a, shown in the arrangment in FIGURE 5 provide such means.

I claim:

1. Automatic adjusting means for the headlamps of a wheeled vehicle having a resiliently suspended body for maintaining a substantially constant angle of light beams emitted by the headlamps relative to a mean plane containing the axes of the vehicle wheels, including, headlamps of which at least the reflectors are tiltably mounted on the vehicle body about a substantially horizontal and transversely arranged axis, devices connected to the headlamps to apply tilting motion to the headlamps, anti-roll bars mounted rotatably on the vehicle body towards the front and the rear of the latter and connected to parts of the vehicle on which the wheels are attached, crank arm devices at central regions of the anti-roll bars, actuating means engagingly associated with the crank arm devices and the devices connected to the headlamps to effect responsive tilting movement of the headlamps proportionately to uneven displacement of the front and rear ends of the vehicle body relative to said plane.

2. Means for automatically adjusting the headlamps of a vehicle having a resiliently suspended body for maintaining a substantially constant angle between light beams emitted by the headlamps and a mean plane containing the axes of the vehicle wheels on depression of an end portion of the vehicle relative to the said plane, including pivot mountings on the body for at least the reflector units of the headlamps about substantially horizontal and transverse axes, a member associated with the sprung and unsprung parts of the vehicle at a position where substantially the greatest downward depression of the body relative to the said plane takes place on loading of the body and being relatively movable to the sprung and unsprung parts in proportion to the amount of body depression, a sealed conduit having volume changeable elements and containing a fluid, at least one volume changeable element being associated with the movable member between the sprung and unsprung parts for effecting a change in volume of said element and displacement of fluid to and from another volume changeable element which is associated with a mechanism connected to the pivotally mounted headlamp reflector units for tilting of the units on changing of the volume of said element, and a flow restriction aperture in said conduit at a position forwardly of the last mentioned element to retard fluid transferred to and from said last mentioned element, said mechanism having bias means applied to it and adapted to assist and restrain the tilting action on decreasing and increasing the volume of the element operating such mechanism and whereby the reflector units are tilted to an extent proportional to the relative movement of the sprung and unsprung vehicle parts.

3. Means for automatically adjusting the headlamps of a vehicle having a resiliently suspended body for maintaining a substantially constant angle between light beams emitted by the headlamps and a mean plane containing the axes of the vehicle wheels on uneven depression of the front and rear ends of the body relative to said plane, including pivot mountings on the body for at least the reflector units of the headlamps about substantially horizontal and transverse axes, members at both the front and rear ends of the vehicle which are attached to and movable relative to the sprung and unsprung parts of the vehicle on movement of the sprung vehicle part relative to unsprung parts at the opposite ends of the vehicle, said movable members being arranged to operate independently of one another and to extents dependable on body depression at the front and rear of the vehicle, actuating means between said movable members and a device acting on the tiltably mounted headlamp units, the independent movement actions of said movable members at the front and the rear of the vehicle being arranged to produce oppositely directed forces on the actuating means on depression of both ends of the vehicle body to cause movement of the headlamp units, through the device disposed between such actuating means and the headlamp units, to an extent which is proportionally to the difference in depression of the vehicle body at the front and at the rear of the vehicle.

4. Means for automatically adjusting the headlamps of a vehicle having a resiliently suspended body for maintaining a substantially constant angle between light beams emitted by the headlamps and a mean plane containing the axes of the vehicle wheels on uneven depression of the front and rear ends of the body relative to said plane, including pivot mountings on the body for at least the reflector units of the headlamps about substantially horizontal and transverse axes, independently movable members at both the front and rear of the vehicle attached to the sprung and unsprung parts of the vehicle and which are movable relative to said parts on relative movement of said parts at said ends, mechanical actuating means attached to the movable members at the front and the rear of the vehicle and movable by such members when relative movement of the sprung and unsprung vehicle parts takes place, said actuating means being also connected to a crankarm of an oscillatable shaft having biasing means and to which the headlamp reflector units are connected, said actuating means comprising an elongated element and a cable having a longitudinally displaceable core element in the casing element, the core element of the cable has its end connected to the said crankarm and to crankarm means provided on one movable member whereas the casing element has the end adjacent the movable member fixed to the vehicle body at the opposite end to a movable device, the other elongated element of the actuating means has its ends connected to a crankarm on the other movable member and the movable device whereby the position of said device and the end of the cable casing element relative to the crank arm is controlled by the depressed position of the vehicle body at one end of the vehicle whereby the effective extent of displacement by the core element of the crankarm, and the extent of tilting of the headlamp reflector units, due to depression of the other end of the vehicle body is controlled for tilting of the headlamp reflector units, against biasing means, to be in proportion to the difference of depression of the opposite ends of the vehicle body.

5. Means for automatically adjusting the headlamps of a vehicle having a resiliently suspended body for maintaining a substantially constant angle of light beams emitted by the headlamps relative to a mean plane containing the axes of the vehicle wheels on uneven depression of the front and rear ends of the body relative to said plane, including pivot mountings on the body for at least the reflector units of the headlamps about substantially horizontal and transverse axes, independently movable members at both the front and rear ends of the vehicle which are movable relative to the sprung and unsprung parts of the vehicle on relative movement of said parts at the ends of the vehicle, actuating means operated by said movable members and actuating a headlamp reflector unit tilting mechanism incorporating an oscillatable shaft having crankarms and links connected to the reflector units and a crankarm engageable by the actuating means, the actuating means consisting of a sealed conduit containing a fluid and having at least one volume changeable element engageable by the movable member at the front of the vehicle, at least one volume changeable element engaged by the movable member at the rear of the vehicle, another volume changeable element engaging the crankarm of the reflector unit tilting mechanism, the volume changeable element at one end of the vehicle being arranged to expand on depression of that end of the vehicle body whereas the element at the opposite end of the vehicle is compressed on depression of that end of the vehicle body while the volume changeable element, acting on the headlamp reflector unit tilting mechanism is expanded and contracted when the fluid is displaced therein and therefrom, the extent of fluid displacement being proportionately to the resultant difference of the change in volume of the elements at the opposite ends of the vehicle.

6. Means for automatically adjusting the headlamps of a vehicle as claimed in claim 5, wherein the volume changeable elements consist of sealed compressible hollow resilient material bulb-like members which are biased to the expanded state and mounted in contact with the members which are movable relative to the sprung and unsprung parts of the vehicle and the headlamp reflector unit tilting mechanism, the conduit having a passage leading to the tilting mechanism engaging element of restricted aperture adapted to retard the flow of fluid to and from said element.

7. Means for automatically adjusting the headlamps of a vehicle as claimed in claim 5, wherein the volume changeable elements comprise cylinder and piston assemblies of which the cylinders and pistons are connected to relatively movable sprung and unsprung front parts of the vehicle.

8. Means for automatically adjusting the headlamps of a vehicle having a resiliently suspended body for maintaining a substantially constant angle of light beams emitted by the headlamps relative to a mean plane containing the axes of the vehicle wheels on uneven depression of the front and rear ends of the body relative to said plane, including: pivot mountings on the body for at least the reflector units of the headlamps about substantially horizontal and transverse axes; a mechanism consisting of a transverse and horizontally located oscillatable shaft, crankarms on the shaft connected to the reflector units at eccentric positions relative to their pivoting axes, a further crankarm on the shaft on which actuating means operate for tilting of the headlamps, and means for imparting a high moment of inertia to the shaft; the actuating means comprising a sealed conduit having volume changeable elements of which one is associated with the further crankarm of the oscillatable shaft; independently movable members at both the front and rear of the vehicle and which are movable relative to the sprung and unsprung parts of the vehicle on relative movement of the said parts at the front and rear of the vehicle, said movable members providing means acting on other volume changeable elements of the sealed conduit at the front and the rear of the vehicle for displacing the fluid contained by the said sealed conduit to and from one another on depression of the vehicle body and to and from the element associated with the crankarm for expanding and contracting said latter element to produce responsive movement of the headlamp reflector unit tilting mechanism in proportion to the difference of depression of the vehicle body at the front and the rear; temperature and atmospheric pressure responsive means associated with the oscillatable crankarmed shaft and adapted to counteract movement of the headlamp reflector units due to variation in temperature and atmospheric pressure.

9. Means for automatically adjusting the headlamps of a vehicle as claimed in claim 8, wherein the temperature responsive means comprises a bi-metallic elongated member which forms the crankarm of the oscillatable headlamp reflector tilting shaft and which member is engaged by the volume changeable element of the sealed conduit supported on a fixed part.

10. Means for automatically adjusting the headlamps of a vehicle as claimed in claim 8, wherein the means responsive to temperature and atmospheric changes comprises a lever pivotally mounted on the body and carrying adjacent one end the volume changeable element operating the tilting mechanism and having the opposite end engaged by a device which is sensitive to and responsive to changing temperature and atmospheric pressure and adapted to counteract the actions of the sealed conduit due to changing temperature and atmospheric pressure.

11. Means for automatically adjusting the headlamps of a vehicle as claimed in claim 8, wherein the means responsive to temperature changes includes a bi-metallic arm fixed in cantilever fashion to the vehicle body and mounting on the free end the volume changeable element of the sealed conduit acting on the crankarm of the oscillatable cranked shaft of the headlamp tilting mechanism, the free end of the said bi-metallic arm being arranged to move towards and away from said crankarm in accordance with changes in temperature.

12. Means for automatically adjusting the headlamps of a vehicle as claimed in claim 8, wherein the volume changeable elements, operated on by the members movable relative to the sprung and unsprung parts of the vehicle, are mounted on resilient shock cushioning devices.

13. Means for automatically adjusting the headlamps of a vehicle as claimed in claim 8, wherein the fluid within the sealed conduit is air sealed therein under atmospheric pressure.

14. Means for automatically adjusting the headlamps of a vehicle as claimed in claim 8, wherein the fluid within the sealed conduit is a liquid, such liquid contained sealed conduit with volume changeable elements providing ram means and liquid replenishing means.

15. Means for automatically adjusting the headlamps of a vehicle as claimed in claim 8, wherein biasing means is provided between the crankarm of the oscillatable shaft and the mounting of the volume changeable element operative on said crankarm preventing unintentional relative movement.

References Cited by the Examiner

UNITED STATES PATENTS

| | | | |
|---|---|---|---|
| 2,049,802 | 8/1936 | Hamm | 240—62.3 |
| 2,105,866 | 1/1938 | Sheaffer | 240—7.1 |
| 2,250,734 | 7/1941 | Thompson et al. | 240—62.3 |
| 2,846,551 | 8/1958 | Linder et al. | 240—7.1 X |
| 3,177,355 | 4/1965 | Trowbridge | 240—62.3 X |

NORTON ANSHER, *Primary Examiner.*

C. R. RHODES, *Assistant Examiner.*